United States Patent [19]

Nelson et al.

[11] 3,945,270

[45] Mar. 23, 1976

[54] FRICTION DRIVE TRANSMISSION

[75] Inventors: Bertel S. Nelson, Naperville;
Woodrow D. Nelson, Lockport, both of Ill.

[73] Assignee: Wedgtrac Corporation, Yorkville, Ill.

[22] Filed: Feb. 18, 1975

[21] Appl. No.: 550,545

[52] U.S. Cl. .................................. 74/798; 74/206
[51] Int. Cl.² ........................................ F16H 13/14
[58] Field of Search ............ 74/206, 798, 801, 789, 74/337, 208, 202

[56] References Cited
UNITED STATES PATENTS

| | | | |
|---|---|---|---|
| 1,060,865 | 5/1913 | Sundh | 74/206 |
| 1,093,922 | 4/1914 | Dieterich | 74/206 |
| 1,212,462 | 1/1917 | Donnelly | 74/206 |
| 3,060,767 | 10/1962 | Parrett | 74/798 |
| 3,380,312 | 4/1968 | Barske | 74/206 |
| 3,776,051 | 12/1973 | Kraus | 74/206 |
| 3,848,476 | 11/1974 | Kraus | 74/206 |

Primary Examiner—Samuel Scott
Assistant Examiner—A. Russell Burke
Attorney, Agent, or Firm—Oltsch & Knoblock

[57] ABSTRACT

A rotary motion transmitting device including traction rollers for transmitting motion in either direction from an input shaft to an output shaft. One shaft carries an internal traction ring and the other shaft, whose axis is parallel to, but slightly spaced from, the traction ring shaft, extends into the traction ring and carries an inner roller to form a varying annular space. Three intermediate traction rollers are angularly disposed within this annular space and are urged into firm Hertzian contact with both the traction ring and the inner roller by means of the torque transmitted through the device. The five traction rollers have a sum of degrees of freedom of movement in a plane perpendicular to the axes of the rollers equal to 8, 9 or 10.

18 Claims, 16 Drawing Figures

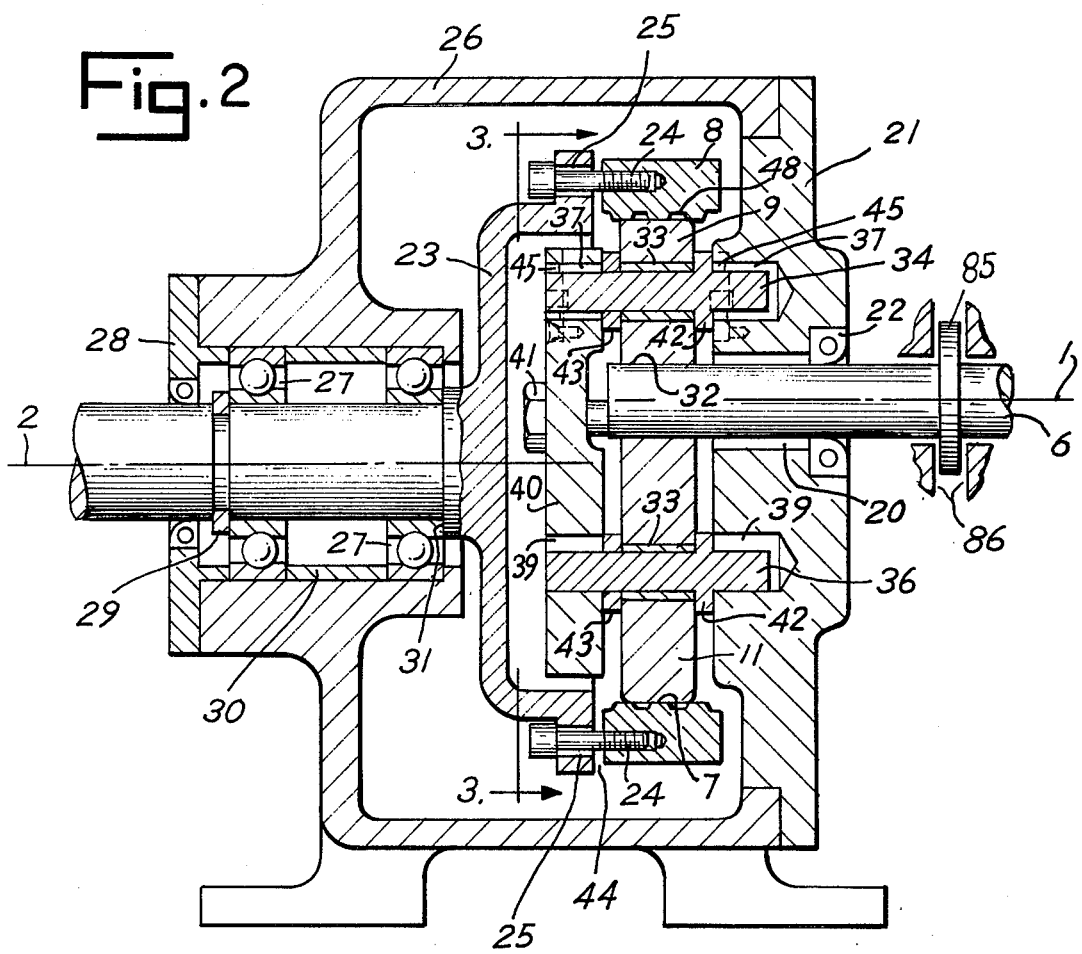
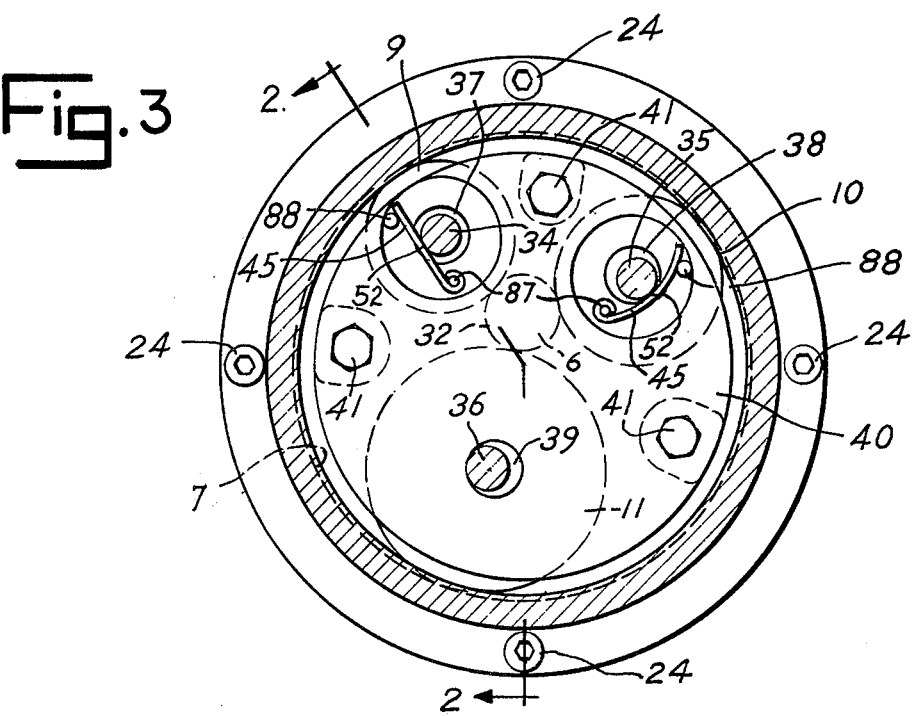

NO DEGREES OF FREEDOM
NO INDEPENDENT VARIABLES

ONE DEGREE OF FREEDOM
ONE INDEPENDENT VARIABLE

TWO DEGREES OF FREEDOM
TWO INDEPENDENT VARIABLES

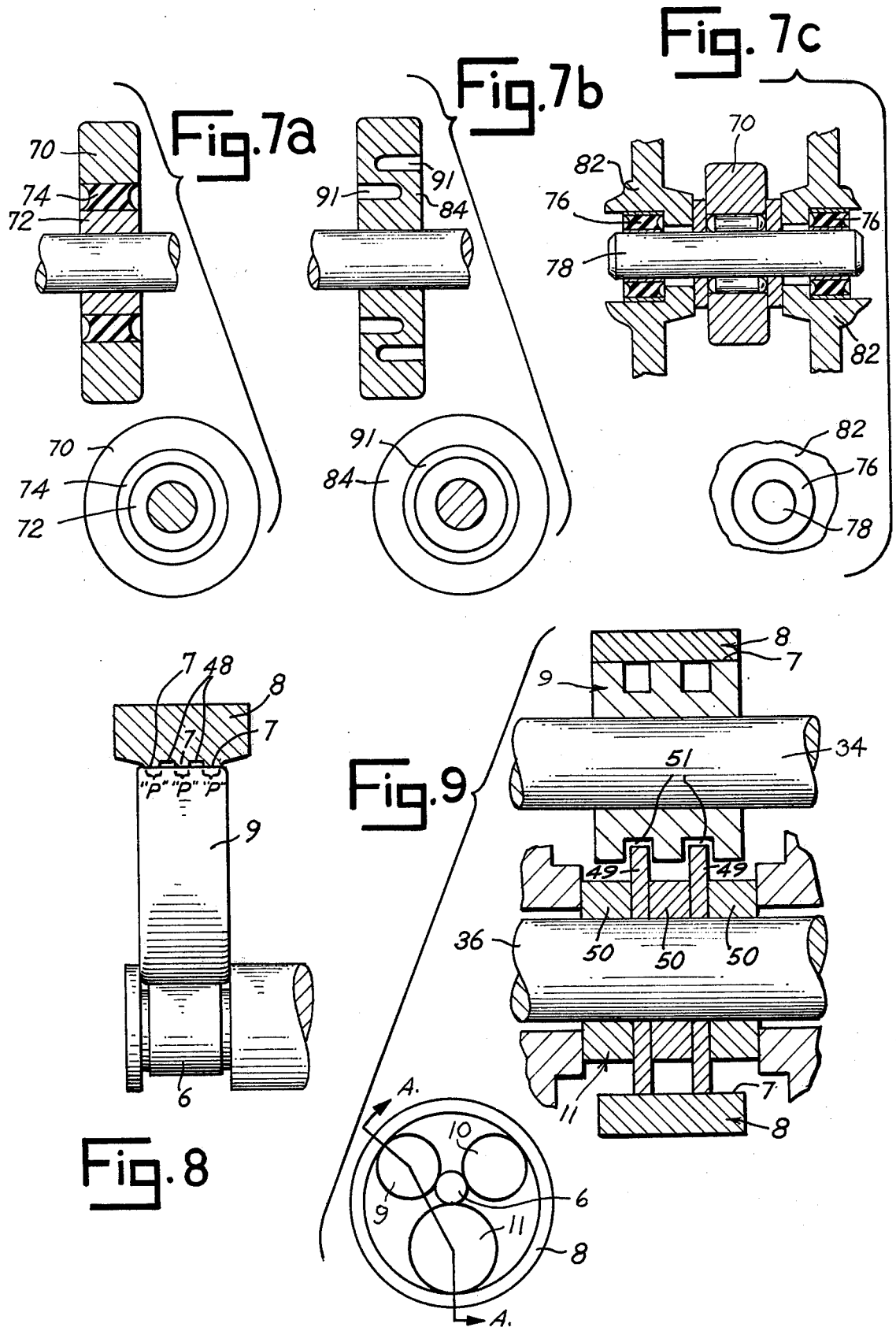

FRICTION DRIVE TRANSMISSION

BACKGROUND OF THE INVENTION

Useful tangential forces transmitted between two friction wheels depend on the properties of the surfaces in engagement with each other and the amount of contact force compressing the engaging surfaces together. For a given coefficient of friction between engaging surfaces and a fixed amount of contact force, there is a limit to the size of the tangential force that can be transmitted before slip occurs.

The engineering theory of the geometry, deformations and state of stress of two elastic bodies with curved surfaces in tangential contact is dealt with in "FORMULAS FOR STRESS AND STRAIN" by R. J. Roark, Chapter 13, McGraw-Hill, New York, 1954. The term "Hertzian Contact" used in the specification refers to the intimate surface contact zone between loaded traction rollers which follows the engineering theory referenced above. "Hertzian Zone" is the contact zone itself. Hertz was the mathematician who developed the theory of surface stresses in "H. Hertz: 'GESAMMELTE WERKE', Volume 1, Leipzig, 1895."

Fixed ratio friction wheel transmissions are of two types:

The first is where the friction wheels are arranged so as to be engaged with each other with a fixed predetermined contact force chosen to prevent slip at the maximum load. Unnecessarily large contact forces are imposed at lower transmitted loads resulting in lower life expectancy.

The second type has the friction wheels arranged so that they are firmly engaged by contact forces that are developed by internal reactions to torque being transmitted. This type can be further classified as to whether the friction wheel bearings must carry very high contact forces found between the friction wheels or relatively low tengential forces delivering the useful work in the transmission.

The present invention is of the second type where the bearings carry only low tangential forces.

Examples of various fixed ratio friction wheel transmissions are described in "MECHANICAL DESIGN AND SYSTEMS HANDBOOK" by Harold A. Rothbart, pp. 14–8 and 14–9, McGraw Hill, New York, 1964.

Essential to successful operation of the present and prior inventions of this type is that the traction roller elements be permitted sufficient freedom of movement so each roller can share in load carrying.

Advantages of these transmissions, if they can be made to work, include:

1. Contact forces between all traction rollers are torque responsive. Therefore, the tractive capability of the transmission to deliver torque automatically changes to exactly meet the load level demanded. This makes gross slippage of traction rollers nearly impossible under normal operating conditions.
2. The design arrangement is simple and reflects in low manufacturing and assembly costs.
3. High bearing loads are virtually eliminated since major contact forces between rollers are internally counter-balanced by the traction rollers and are not reacted out into bearings.
4. Increase or reduction speed ratios can be obtained ranging from less than 2:1 to over 25:1.
5. Extremely high speeds can be handled at relatively low surface velocities thus offering new design alternatives for high speed machinery.

Numerous attempts have been made by past inventors in proposing design approaches that utilize traction roller arrangements resembling the present invention in order to gain some of these advantages. However, virtually all of the prior art has failed to take into account the adverse influence of elasticity of engineering materials used in traction roller drive designs on the actual operating geometry. Previous designs strongly suggest poor load sharing capability of the power rollers. When the traction rollers are not free to adjust position to accommodate the various elastic deformation effects inevitably induced by the transmitted load, they experience high wear, excessive creep, rapid heat generation, noise and poor speed and torque efficiency.

Since the key feature that differentiates the present invention from prior art is essentially the number of degrees of freedom permitted the five traction rollers, specific definitions and clarifications are hereby made:

In general, the number of degrees of freedom possessed by a moving body relative to a fixed frame of reference is determined by the number of independent variables that are required to define its position. Of interest in the present invention and in prior art are those degrees of freedom present in the principle plane of rotation of the rollers which is that plane which is perpendicular to the roller axes. The only degrees of freedom possible in the principle plane of rotation in devices of the type under consideration are: one in rotation about the roller axis, and either, none, one or two, in translation of the geometric center of the roller from the fixed reference. "Geometric center", as used herein is defined as the center of a circle formed by the intersection of a plane and the traction surface of the roller with the plane intersecting the traction surface at a right angle to the roller axis.

Only the degrees of freedom in translation are of specific interest here. For further clarification, consider the three cases shown in FIG. 6 in which graphic illustrations of degrees of freedom are made.

There are very subtle, but vitally important reasons why consideration of the number of degrees of freedom is essential in the design of traction drives of the type described in the present invention:

It has been found that the actual dynamic operating geometry assumed by the rollers under load and speed is significantly different from that present in the static, unloaded state. The differences are not easily discovered except by careful analysis and testing.

Elastic deformations occur in the rollers, bearings, shafts, etc., such that the operating geometric centers of the rotating parts shift to new dynamic positions. Unless these displacements can be accommodated in a predictable fashion in the design of the device, it will experience wear, noise and other related operating problems. Undoubtedly inventors in prior art were faced with the dilemma of either accepting poor performance or building the devices so heavy and cumbersome to control deformations that they became impractical. Also, as components are made stiffer, they must also be made more accurate and, therefore, more costly. It is probably noteworthy that none of the devices proposed by the prior art has exhibited any significant commercial success to date.

One prior invention, Barske U.S. Pat. No. 3,380,312, requiring a total of not more and not less than 6° of freedom, clearly shows that the two reaction rollers, in a five roller system, always have 0° of freedom each and thus correspond to the FIG. 6a example. The inventor very clearly illustrates by diagram and by description when he is intending either 0, 1 or 2 degrees of freedom. His definitions of degrees of freedom are substantially in agreement with those in FIGS. 6a, b and c.

A more recent invention, Kraus U.S. Pat. No. 3,776,051, of a somewhat related roller arrangement involving six traction roller elements does not discuss essential degrees of freedom per se, except for the wedging roller; but does clearly illustrate by diagrams that the device, depending on interpretation, has either 4 or 5 degrees of freedom at most and will not care for the adverse effects of elastic deformation previously discussed.

A very early invention of related construction Dieterich U.S. Pat. No. 1,093,922 clearly shows a five roller device with an internal ring with 2° of freedom, an intermediate roller with 1°, an inner sun roller with 0° and the remaining two intermediate rollers with either 1 or 2 degrees each. Therefore, the total degrees of freedom of movement for this early system are either 5 or 7, but definitely not 8, 9 or 10.

SUMMARY OF THE INVENTION

This invention relates to a rotary motion transmitting device for transmitting power in either direction of rotation at a fixed transmission ratio by means of frictionally engaging motion transmittting surfaces.

The present invention transmits power through smooth cylindrical traction rollers arranged such that an inner sun roller is positioned eccentrically within an internal traction ring roller thus forming a narrowing annular space into which three intermediate planetary rollers are angularly disposed in force equilibrium so that each are in firm Hertzian contact simultaneously with both the internal ring roller and the inner sun roller. Contact forces between all traction rollers are torque responsive. Therefore, the tractive capability of the transmission to deliver torque automatically changes to exactly meet the load level demanded. This makes gross slippage of traction rollers substantially impossible under normal operating conditions. The design arrangement of the motion transmission device is simple and reflects in low manufacturing and assembly costs. High bearing loads are virtually eliminated since major contact forces between rollers are internally counterbalanced by the traction rollers and are not reacted out into bearings. Extremely high transmitting speeds can be handled by this invention at relatively low surface rolling velocities, thus offering new alternatives to high speed machine designers. Basic design novelty provides proper degrees of freedom for the power rollers and allows the rollers to evenly share transmitted loads which reflects in quieter, longer life operation of the device. Novel design techniques provides balanced roller contact stresses which results in more economical, lighter weight transmissions.

Virtually all previous efforts in designing power transmitting devices utilizing traction roller arrangements of the type contemplated by this invention have failed to take into account the adverse influence of elasticity of engineering materials used in the traction roller elements. Small, but predictable deformations occur at the loaded traction surfaces and in the roller and traction ring blanks which cause predictable changes in the geometric operating position of the loaded rollers.

Unless traction rollers are free to adjust position to accommodate the various elastic deformation effects on operating geometry, traction surfaces on the rollers experience high wear, excessive creep, rapid heat generation, noise and poor speed and torque efficiency. The present invention overcomes these deficiencies contained in prior art by designing the transmitting device so that:

1. The sum of the degrees of freedom of movement of the geometric centers of the five traction rollers in their principle planes of rotation must be equal to either 8, 9 or 10;
2. The five traction roller diameters and coordinate positions of their geometric centers must follow definite mathematical relationships heretofore not defined by prior art; and
3. Traction contact stresses must be balanced at the various contact lines between the rollers according to definite mathematical equations if optimum design proportions and transmission performance are to be realized.

The present invention always provides the two essential reaction roller members with at least 1° of freedom each making the total degrees for the system equal to a minimum of 8. The system is still statically determinate and provides the needed accommodation for the troublesome elastic deformations.

Accordingly, it is an object of this invention to provide a rotary motion transmitting device having quiet, substantially vibration free operating characteristics.

Another object of this invention is to provide a friction rotary motion transmitting device having a long operative life.

Still another object of this invention is to provide friction rotary motion transmitting devices in which the fixed speed ratios can vary from less than 2:1 to over 25:1.

And still another object of this invention is to provide a rotary motion transmitting device of economical construction.

Other objects of this invention will become apparent when reading the following description and Claims.

BRIEF DESCRIPTION OF DRAWINGS

FIG. 2 is a longitudinal sectional view of the transmission device taken along line 2—2 of FIG. 3.

FIG. 3 is a cross sectional view taken along line 3—3 of FIG. 2.

FIGS. 7a, 7b and 7c are illustrative of three additional embodiments of the present invention for accomplishing 2° of freedom of movement with rollers of the transmitting device.

FIG. 8 is a longitudinal sectional view showing traction roller contacts and balancing of stresses by use of stress reliefs.

FIG. 9 is a longitudinal sectional view of interleaving intermediate rollers.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
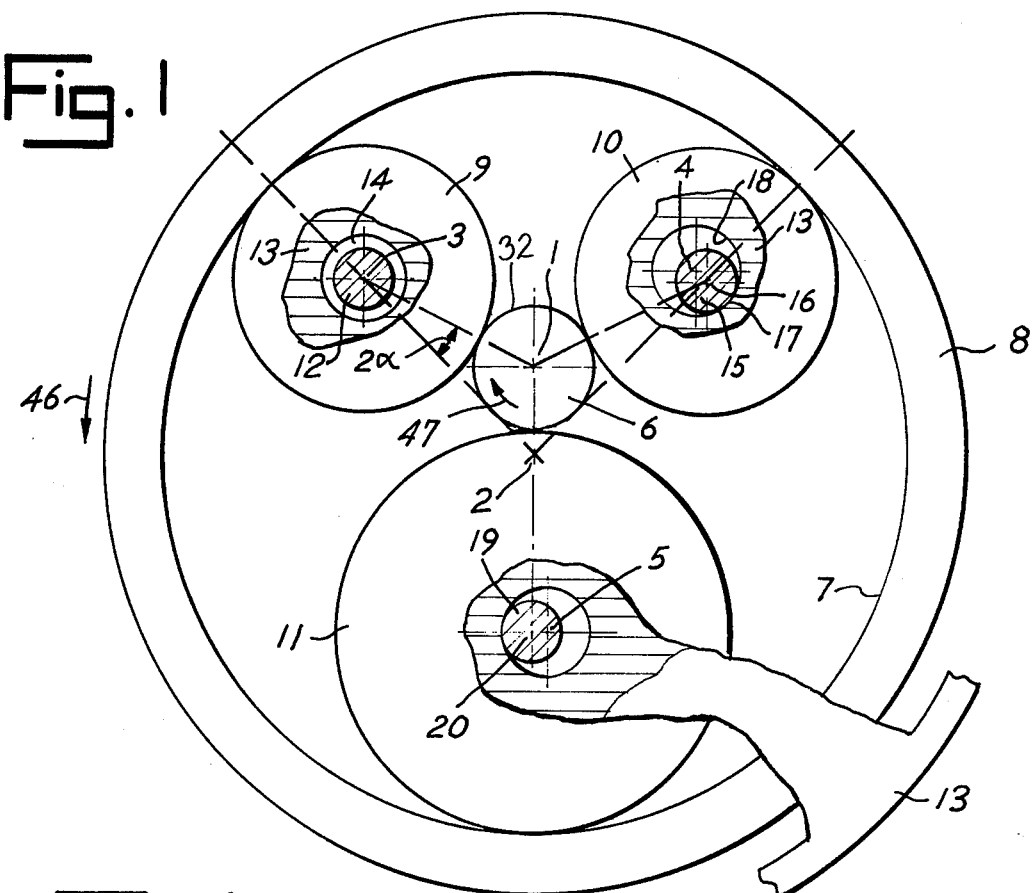
FIG. 1 is a diagrammatic illustration showing the essential components of the invention.

FIG. 1 is an elementary diagram showing the basic principle by which the transmission operates. In its simplest form, the transmission consists of a high speed axis of rotation 1, a low speed axis of rotation 2 offset and parallel to axis 1, three roller support hole centers 3, 4 and 5, all parallel to axes 1 and 2 and each angularly spaced about low speed axis 2. The power transmitting members are substantially rigid cylindrical bodies containing smooth traction contact surfaces which when brought into intimate Hertzian contact with like surfaces, will have the capacity to transmit useful tangential forces about the axes of rotation of the contacting bodies. In FIG. 1, the power transmitting members take the configuration of external and internal cylindrical traction rollers 6, 8, 9-11.

The inner traction sun roller 6 rotates about axis 1 and is positioned eccentric to and within an internal traction surface 7 contained on the ring roller 8 operating on axis 2. Intermediate rollers 9, 10 and 11 are nominally located on support hole centers 3, 4 and 5 within the narrowing annular space formed between ring roller 8 and sun roller 6 so that each intermediate roller g-11 remains firmly engaged in Hertzian contact simultaneously with both the ring and sun rollers in such a manner that the normal contact forces between the rollers are directly proportional to the torque transmitted by the transmission device. To obtain these torques responsive Hertzian contact forces between rollers, the following conditions are essential:

A. At least one of the intermediate rollers 9-11, known as the wedging roller, must have 2° of freedom of translational movement in the principle plane of rotation of the roller.

B. The remaining two intermediate rollers, known as the reaction rollers, must each have at least 1° of freedom of translational movement, in the principle plane of rotation of the rollers.

C. The sun roller 6 and ring roller 8 each must have 2° of freedom of translational movement in the principle plane of rotation of the rollers.

Figure 6A:
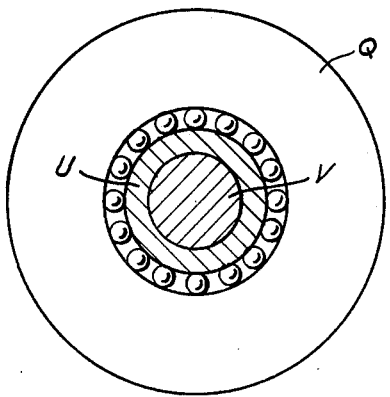
FIGS. 6a, 6b and 6c are diagrammatic illustrations of the concepts of "degrees of freedom of movement".
Figure 6B:
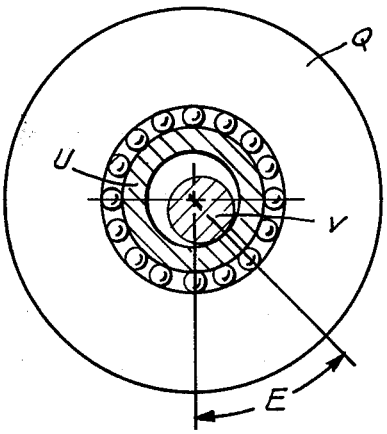
Figure 6C:
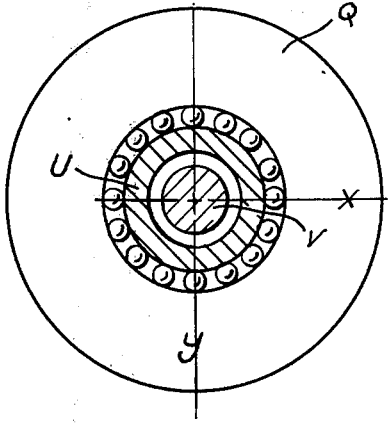

From the above description, it becomes apparent that this transmission device must have a minimum total of 8° of freedom of movement in the principle plane of rotation of the rollers. The term "degree(s) of freedom of translational movement" or simply "degree(s) of freedom of movement" as used in the specification and Claims refer to the number of independent variables required to define the position of the geometric center of a roller traction surface relative to the geometric center of its fixed support within the principle plane of rotation of the roller. "The principle plane of rotation of a roller" is defined as a plane which is perpendicular to the axis of the roller. By this definition, each roller can have but 1, 2 or no degrees of freedom of movement. Examples of various degrees of freedom of movement are shown in FIGS. 6a, 6b and 6c. In FIG. 6a, the shaft "V" of roller "Q" seats snugly in its race support "U", permitting no degrees of freedom of movement. In FIG. 6b, shaft "V" of roller "Q" contacts its race support "U" at one point, with the location of the geometrical center of the roller being determined by one independent variable "E". Therefore, roller "Q" in FIG. 6b has 1° of freedom of movement. In FIG. 6c, shaft "V" of roller "Q" does not contact its race support "U" so that the location of the geometrical center of the roller must be determined by two independent variables "X" and "Y". Therefore, roller "Q" in FIG. 6c has 2° of freedom of movement.

FIGS. 6a, 6b and 6c are illustrative of the principle of degrees of freedom of movement by the use of one specific arrangement of a roller, a bearing and a shaft.

In practice, freedom of translational movement of rollers can be accomplished in several ways: shaft bearing seats can be machined slightly undersize and/or bearing bores can be made oversize to acquire needed clearance as shown in FIGS. 6a, b, c. Likewise, bearing outside diameters can be made undersize and/or mating housing bores can be made oversize. Still another method is to use standard anti-friction bearings with extra internal clearances obtained by adjustment during bearing installation.

The transmission device illustrated in FIG. 1 works as follows: Roller 9 is fixed tightly to shaft 12 and rotates about axis 3. The design geometry of the device is such that under operating loads, roller shaft 12 has clearance 14 relative to the locating hole in the fixed frame 13. Shaft 12, and therefore, roller 9 are free to move in translation in any direction in the plane of the drawing or the principle plane of rotation of the roller so long as clearance 14 remains a measurable value. Roller 9, therefore, has 2° of freedom of movement in translation and is the wedging roller of the device. Roller 10 is likewise fixed tightly to shaft 15 and rotates about axis 16. During operation, shaft 15 remains in contact at point 17 with the locating hole surface 18 in the fixed frame 13. Anti-friction bearings could, of course, be used but FIG. 1 shows a simple hole and shaft for purposes of clarity. To accommodate deformations under varying transmitted loads, roller 10, which has 1° of freedom of movement, can freely move on a single constrained circular path described by hole surface 18. In so moving, contact point 17 changes location about hole perimeter 18 to provide a reaction point that is self-adjusting to imposed loads and deformations on the rollers. Roller 10 is known as a reaction roller. Roller 11 is fixed tightly to shaft 19 and rotates about axis 20. Operation of roller 11 is similar to that of roller 10 in that it has 1° of freedom of movement and is also a reaction roller. Rollers 10 and 11 thus provide a balancing internal reaction couple to the externally applied input and output torque moments on the system. Sun roller 6 has 2° of freedom of translational movement. Ring roller 8 also has 2° of freedom of translational movement in its principle plane of rotation. Rotation of sun roller 6 in the direction of arrow 47 will cause rotation of rollers 9-11 and the resulting rotation of ring roller 8 in the direction of arrow 46.

FIGS. 2 and 3 are views of one of many possible embodiments of this invention. The rotary motion transmission device depicted in these figures includes a main housing 26 to which is firmly secured a housing end cover 21. The main housing 26 is provided with an opening through which extends one end of a ring shaft 23. Shaft 23 is internally supported by bearings 27 trapped in axial position by secured seal carrier 28, retaining ring 29, spacer 30 and shoulders 31. Housing cover 21 has a clearance opening 20 containing an oil seal 22 and through which extends the inner sun roller 6. Roller 6 has clearance 20 with cover 21 thus permitting 2° of freedom of movement in its plane of rotation. Roller 6 is constrained axially by means external to the transmitting device and is depicted by thrust washer 85 and shoulders 86. Inside of the enclosed housing formed by cover 21 and housing 26, the ring roller 8 is secured to ring shaft 23 by means of fastener screws or devices 24 which extend with clearance 25 through holes in the ring shaft so that the ring roller will have 2° of freedom of movement in its principle plane of rotation. Clearance gap 44 also allows ring 8 to float axially to the extent of the clearance.

The axis 1 of roller 6 is parallel with but displaced from axis 2 of ring 8 by a determinable distance described by mathematical equations that follow. Intermediate rollers 9, 10 and 11 are angularly spaced in the annular path of varying width formed by the internal traction surface 7 of roller 8 and external traction surface 32 of roller 6, as shown in FIG. 3. Rollers 9 and 10 may be different sizes as shown in FIG. 3, or of the same size as shown in FIG. 1, the design choice being guided by the performance characteristics desired of the transmission.

In FIGS. 2 and 3, rollers 9, 10 and 11 all rotate on bearings 33 which are positioned on non-rotatable shafts 34, 35 and 36. The end portions of shafts 34-36 extend into accurately machined clearance holes 37, 38 and 39 in housing cover 21 and a support cover 40 which is firmly secured by screws or fasteners 41 to housing end cover 21. Internal surfaces of clearance holes 38 and 39 function as limit stops for self-adjusting roller alignment with each roller 10 and 11 having 1° of freedom of movement each when the said shaft end portions make contact with the internal surface of the clearance holes. Hole 37 is made large enough to always provide positive operating clearance with shaft 34 so that roller 9 always has 2° of freedom of movement. Rollers 9, 10 and 11 retain their axial positions relative to ring 8 and housing cover 21 by means of shaft shoulders 42 and fitted spacers 43 on the opposite side of rollers 9–10. Gap 44 is a controlled axial clearance between ring 8 and ring shaft 23 permitting ease of radial movement of ring 8 in 2° of freedom of movement. The same play or freedom could also be achieved by means of an articulated joint formed by a loose spline or other means used in connecting the ring 8 and shaft 23.

Roller 9 requires a light energizing force to urge it into initial engagement with surface 7 of ring 8 and surface 32 of ring 6. For this purpose, a spring 45, which is pivotally secured at one end with pin 87 and simply supported against a second pin 88 at the other end, is deflected against the end of roller shaft 34. A second identical functioning set of spring 45 and pins 87 and 88 are provided at the opposite end of shaft 34 in such a manner that the forces developed by the deflected springs are additive and together provide the total initial urging force for roller 9. When rotation and torque sense are reversed, reaction roller 10 becomes the wedging roller and a similar set of springs 45 are used to act on shaft 35 to provide the initial energization. When either roller 9 or 10 is acting as a reaction roller, it fully deflects its own set of energizing springs 45 until its roller supporting shaft firmly contacts the inner surface of its clearance hole, as seen for roller 10 in FIG. 3. Roller shafts 34 and 35 are prevented from rotating by shaft flats 52 which nest springs 45.

Figure 4:
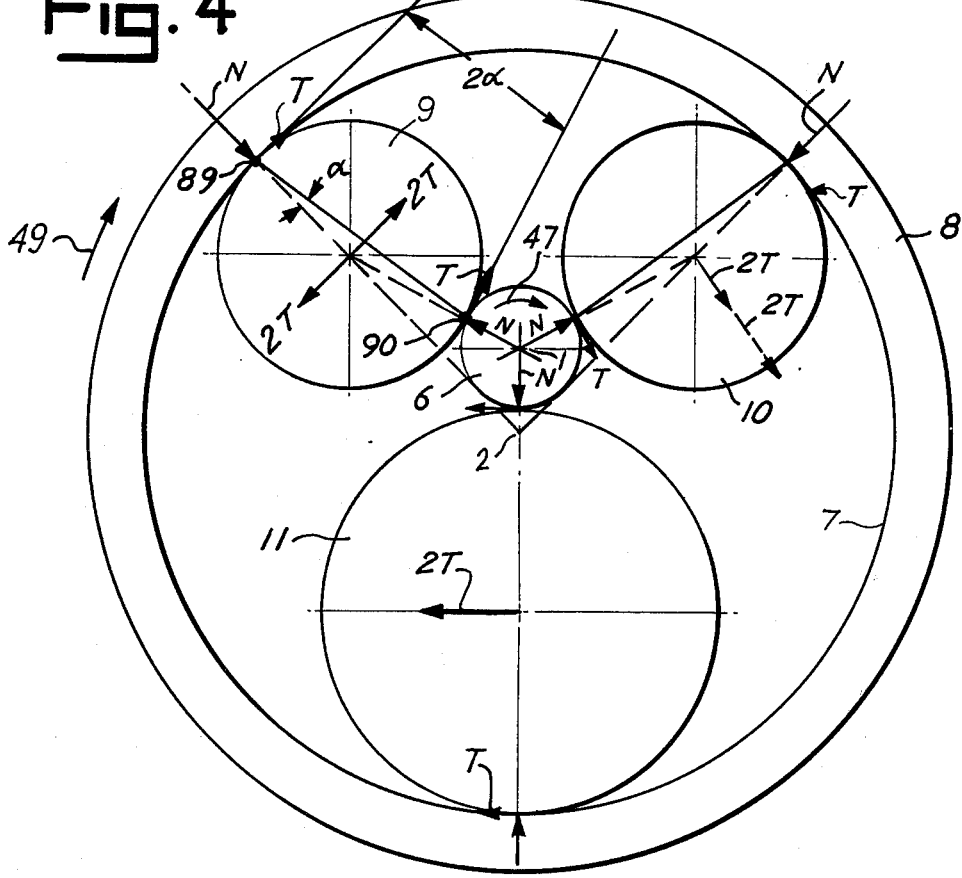
FIG. 4 is a free body force diagram of the rollers of the transmitting device under load during operation.

A force analysis of the roller elements provides further insight into how this invention works. Referring to FIG. 4, assume that applied to the ring roller 8 is a resisting or holding torque moment 49, and applied to the sun roller 6, is a driving torque moment 47. Both quantities are externally applied clockwise torques as shown. A free body force diagram of wedging roller 9 shows that the roller has four main forces acting on it: a normal force N and a tangential force T acting at the contact point 89 with ring 8; and equivalent forces N and T acting at the contact point 90 with the roller 6. Because the forces N are applied at the wedging angle $\alpha$, they have force components equal in magnitude but opposite in direction to tangential work forces T. The net result of this free-body analysis is that the wedging roller 9 remains in "dynamic equilibrium" and does not require the use of bearings to absorb residual reaction. In practice, bearings and axel shafts will be used with wedging rollers to help keep them properly aligned to enable them to be used alternately as reaction rollers in bi-directional drives and to prevent a roller from falling out of engagement with the other rollers under its own weight at zero transmission load if so oriented with gravity.

A similar free-body analysis of reaction roller 10 shows the same normal and tangential forces acting at its corresponding two points of contact but the tangential forces T and the tangential components of normal forces N are in the same direction and are, therefore, additive. Thus, an opposing reactive force must be applied to roller 10 equal to 4 times the tangential force to maintain force equilibrium. This is accomplished by using a shaft 36, bearing 33 and clearance holes 39 to support shaft 36 as seen in FIGS. 3 and 4. A similar force analysis of the second reaction roller 11 will show there is a resultant force 2T or 2 times the tangential force which must be transmitted into its roller supports.

It is, therefore, seen that the wedging force acting on wedging roller 9 is proportional to the useful tangential forces which are proportional to the transmitted torque. By controlling the wedging angle $\alpha$ in design, a preselected ratio of tangential to normal forces may be specified. The wedging angle can be selected to match the probable coefficient of traction obtainable with certain lubricants, finishes, rolling speeds and Hertz stresses. For average commercial quality design utilizing traction lubricants and where rolling speeds are under 5,000 feet per minute, wedging angles between 3° and 5° may be used.

The offset distance between ring roller axis 1 and sun roller axis 2 directly controls the wedging angle $\alpha$. The smaller the offset distance, the larger the normal force N available for a given amount of torque to prevent slip.

It is understood that if the direction sense of the input and output torques are made opposite of the directions assumed in FIG. 4, the roles of wedging roller 9 and reaction roller 10 interchange. Roller 11 would remain a reaction roller in either case but the reactive force would become oppositely directed.

In the power train of this invention, the speed ratio is determined by the ratio of the diameter of the internal traction surface 7 of roller 8 to the diameter of the external traction surface 32 of the sun roller 6. Either the ring shaft 23 or the sun roller shaft 6 may be the input shaft, depending on whether a speed increase or reduction is desired. The system of rollers is non-self-locking at any ratio if anti-friction bearings are used.

Non-self-locking, as used in this specification, means the power train may be freely driven from either the sun roller shaft 6 or from ring shaft 23. Anti-friction bearings can be used in place of sleeve bearings 33 to improve over-all efficiency and to minimize any tendency for self-locking.

The device can transmit power in both clockwise and counterclockwise rotations of the input shaft. Transmission ratios can cover the range from less than 2:1 to over 25:1 in a single stage transmission and much higher in multiple stage transmissions. For ratios above about 12:1, it is necessary to interleave the intermediate rollers such as shown in FIG. 9.

This can be accomplished by replacing the solid roller construction of reaction roller 11 with a stacking of narrow roller discs 49 alternately with spaces 50 and providing accommodating clearance spaces 51 in the remaining intermediate rollers 9 and 10.

A further variation of the present invention allows additional freedom of displacement or movement in the intermediate rollers to care for both unusual elastic deformations in the transmission and for dampening of drive line vibrations. This is accomplished by increasing the number of degrees of freedom of movement for either or both reaction rollers 10 and 11 from 1 to 2 degrees each, making the total degrees for the five roller system equal to 9 or 10. In practice, a reaction roller may be provided with 2° of freedom instead of one by designing controlled elasticity or flexure into the reaction roller and shaft assembly. Practical design approaches to accomplish this are shown in FIGS. 7a, 7b and 7c.

FIG. 7a shows a composite material roller design in which the outer metallic traction race 70 and an inner metallic hub 72 are joined by a resilient, non-metallic substance 74 that permits 2° of freedom of movement of the outer race 70 relative to the inner hub 72.

Another related construction, shown in FIG. 7c, is to provide a resilient, non-metallic substance 76 interposed between shaft 78 and the fixed frame or housing 82. In this case, the roller 70 rotates on a fixed shaft 78 and obtains its 2° of freedom of movement indirectly from the resilient mounted shaft.

Still another approach, as shown in FIG. 7b, does not use an intermediate non-metallic substance but utilizes the principle of design configuration control, in that the basic roller body 84 is uniquely shaped with complete circular grooves 91 as shown in FIG. 7b to provide 2° of freedom of movement in the principle plane of rotation due to the resulting extra-ordinary resiliency or flexure made possible.

Figure 5:
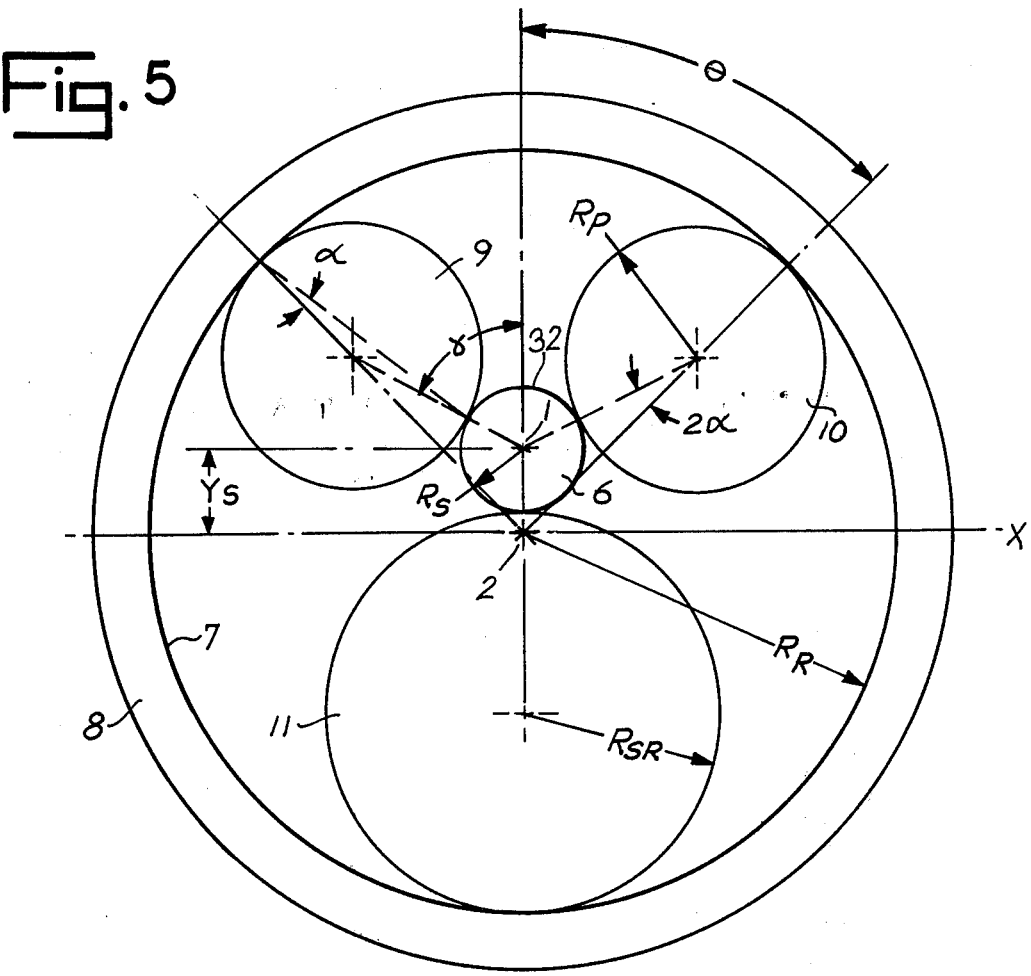
FIG. 5 is a diagram showing the mathematical coordinate system and symbols used in equations included in the specification.

The structural design of the transmission device of this invention is determinable by precise mathematical computations. These computation formulae, referring to FIG. 5, are as follows:

$\theta$:Polar Angle
$\mu_T$:Geometric Coefficient of Traction
$R_R$:Radius of Internal Ring Race Surface 7
$K$:Transmission Speed Radio 1. $\alpha = tan^{-1}\mu_T$ (Where $\alpha$ is the Wedging Angle)

$$R_P = R_R \left\{ \frac{\sin\alpha\sin\theta}{\sin(180°-2\alpha)\sin(180°-\alpha-\theta)} - \frac{1}{K}\left[\frac{\sin\alpha\sin(180°-2\alpha-\theta)}{\sin(180°-2\alpha)\sin(\alpha+\theta)}\right]\right\} \quad 2.$$

(Where $R_P$ is the Smaller Intermediate Roller)

$$Y_S = \left(R_P + \frac{R_R}{K}\right)\left(\frac{\sin 2\alpha}{\sin\theta}\right) \quad 3.$$

(Where $Y_S$ is the Offset Distance Between Axis 2 of the Ring Roller 8 and Axis 1 of Sun Roller 6)

$$R_S = \frac{R_R}{K} \quad 4.$$

(Where $R_S$ is the Radius of Sun Roller 6)

$$R_{SR} = \frac{R_R + Y_S - R_S}{2} \quad 5.$$

(Where $R_{SR}$ is the Radius of the Largest Intermediate Roller)

It can be seen that by specifying the transmission ratio, the size of internal ring 8, the polar angular spacing of intermediate rollers 9, 10 and 11 and the desired coefficient of traction, it is possible to determine the size of the remaining rollers and the offset of the sun roller and ring roller axes.

When the roller sizes and offset axis distance are specified, the polar angle of the intermediate rollers and the geometric coefficient of traction may be determined as follows:

GIVEN: $R_R$, $R_S$, $R_P$, $Y_S$
FIND:
$\theta$:Polar Angle (FIG. 5)
$\gamma$:Angle in FIG. 5
$\alpha$:Wedging Angle (FIG. 5)
$\mu_T$:Geometric Coefficient of Traction $$\cos\theta = \frac{Y_S^2 + (R_R - R_P)^2 - (R_S + R_P)^2}{2Y_S(R_R - R_P)} \quad 6.$$

$$\sin\gamma = \frac{R_R - R_P}{R_S + R_P}\sin\theta \quad 7.$$

$$\alpha = \frac{\gamma - \theta}{2} \quad 8.$$

9. $\mu_T = tan\alpha$

Another important design aspect of the present invention is to proportion the various roller traction surfaces in such a manner that each has approximately the same total operating life. In general, this means the stresses in the Hertzian contact zones of all rollers should be, nearly as possible, the same. Since the combination of relative curvatures, number of stress cycles and contact forces differ for each contact zone, it is desirable to adjust the effective face width of various rollers until the contact stresses are more nearly equal. The effective face width is the axial direction summation of length of Hertzian contact zone between two rollers with allowances being made for interruption by grooves, chamfers, undercuts, etc.

The present invention provides mathematical means for determining the effective face width between each intermediate roller 9, 10 and 11 and the inner tractive surface 7 of the ring roller 8 so that the resulting operating life will be nearly the same as that occurring between the sun roller surface 32 and the intermediate rollers 9, 10 and 11. This may be determined from the following formula:

$$F_{eS} = F_{eR} \frac{R_{eR}}{R_{eS}} \beta \qquad 10.$$

WHERE:

$F_{eS}$ is the total effective face width in Hertzian contact between the sun roller and intermediate rollers.

$F_{eR}$ is the total effective face width in Hertzian contact between the ring roller and intermediate roller.

$R_{eS}$ is the relative radius of curvature between the sun and intermediate rollers as determined by $$R_{eS} = \frac{R_S R_P}{R_S + R_P} \qquad 11.$$

$R_{eR}$ is the relative radius of curvature between the ring and intermediate rollers as determined by $$R_{eR} = \frac{R_R R_P}{R_R - R_P} \qquad 12.$$

$\beta$ is an empirical stress balance factor depending on materials, lubricant, rolling speed, alignment and surface finish.

For hardened steel, traction lubricants, less than 2,000 feet per minute rolling speed, 32 RMS finish rollers, and good commercial quality, use $\beta = 1.0$.

For rolling speeds between 2,000 and 5,000 feet per minute with other factors being equal, use $\beta = 0.9$.

The effective face width is adjusted in an actual design by providing profile relief as shown in FIG. 8. The effective face $F_{eR}$ between traction surface 7 of ring 8 and intermediate roller 9 is the summation of the contacting lands P formed by profile reliefs 48. Profile reliefs may be provided singly or in combination in any or all of the five traction rollers 6, 8–11 depending on stress balancing requirements. The depth of profile relief is determined by considerations of the magnitude of the contact shear stresses.

Figure 10:
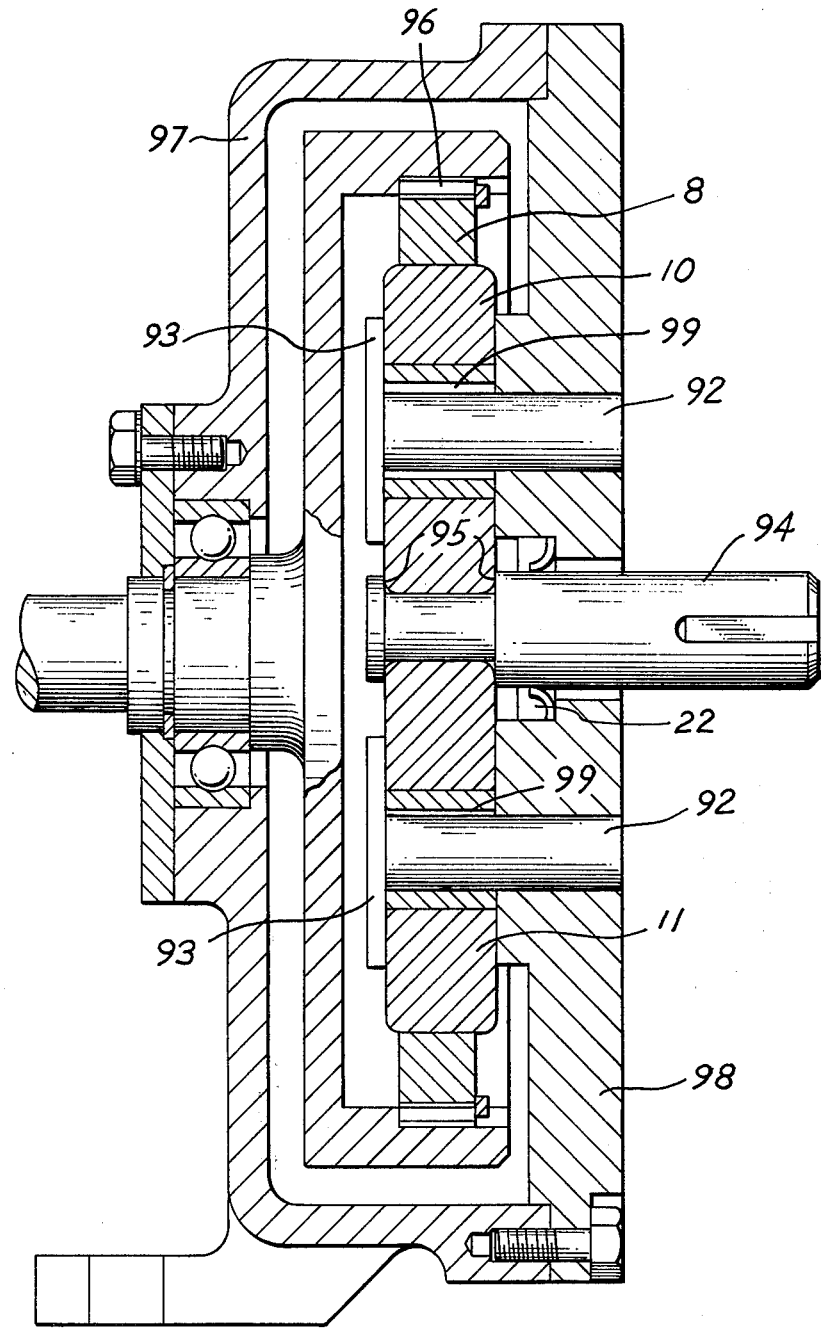
FIG. 10 is a longitudinal sectional view of a cantilevered roller embodiment of the present invention.

A variation in the construction of the present invention which has the advantages of simplicity in design and minimum cost is shown in FIG. 10. Stationary housing 97 has secured to it housing cover 98 forming the main housing enclosure. All three intermediate rollers 9, 10 and 11 are cantilever supported by stationary axel shafts 92 which have constraining flanges 93 to keep rollers aligned with ring 8. Shafts 92 are press-fitted into housing cover 98. Sun roller 94 is floating with the required 2° of freedom of movement and is constrained axially by flanges 95. Item 22 is a shaft seal. Ring 8 is articulated at connection 96 to provide 2° of freedom of movement. Reaction rollers 10 and 11 in FIG. 10 are each provided with at least 1° of freedom of movement by hole clearance gaps 99. The wedging roller assembly is provided with sufficient hole and shaft clearance to permit 2° of freedom of movement and is provided with biasing means for urging the wedging roller into initial engagement.

Figure 11:
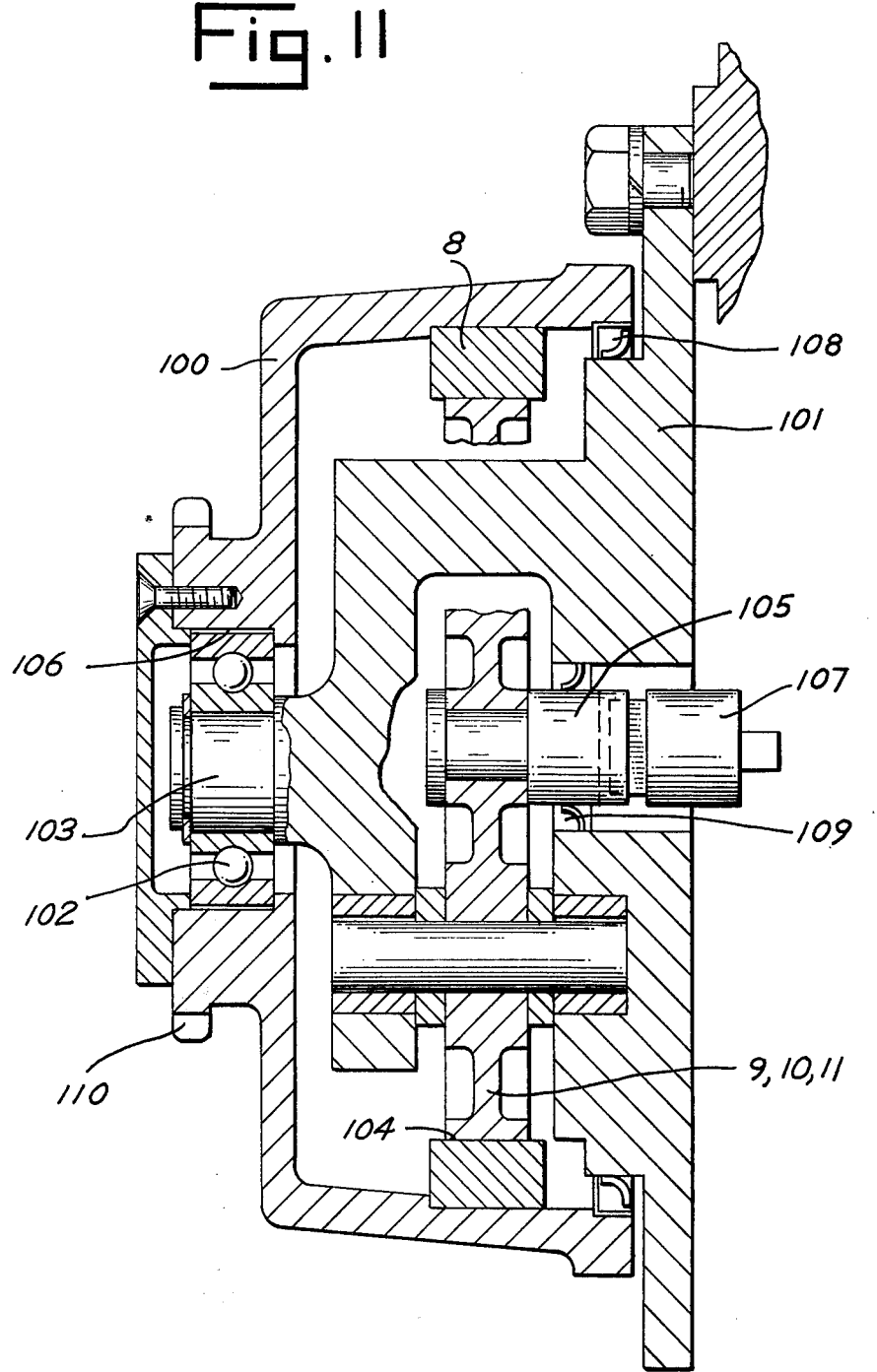
FIG. 11 is a longitudinal sectional view of a rotating housing embodiment of the present invention.

Another variation in design of the present invention which is useful when space envelope is limited and a rotating housing is permissible is shown in FIG. 11. Applications of this type include winches, floor polishers and scrubbers, and power driven wheel hubs.

Rotating housing 100 is supported at one end by bearing 102 mounted on stationary shaft 103 which is an integral part of fixed carrier 101. At the other end, housing 100 is supported by the traction contact 104 of the three intermediate rollers 9–11 with ring 8 which is press fitted in housing 100. Sun roller 105 is free-floating and has 2° of freedom of movement. Ring 8 has 2° of freedom of movement due to a combination of internal clearance in bearing 102 and clearance gap 106 between the bearing outside surface and the housing bore. The three intermediate rollers are provided with means for obtaining a total of at least 4° of freedom of movement similar to that shown in FIGS. 2 and 3. Item 107 is an input shaft coupling and Items 108 and 109 are oil seals. Power may be taken off or put in at any point on the rotating housing 100. In this example, driving lugs or teeth 110 are a power take-off point.

Figure 12:
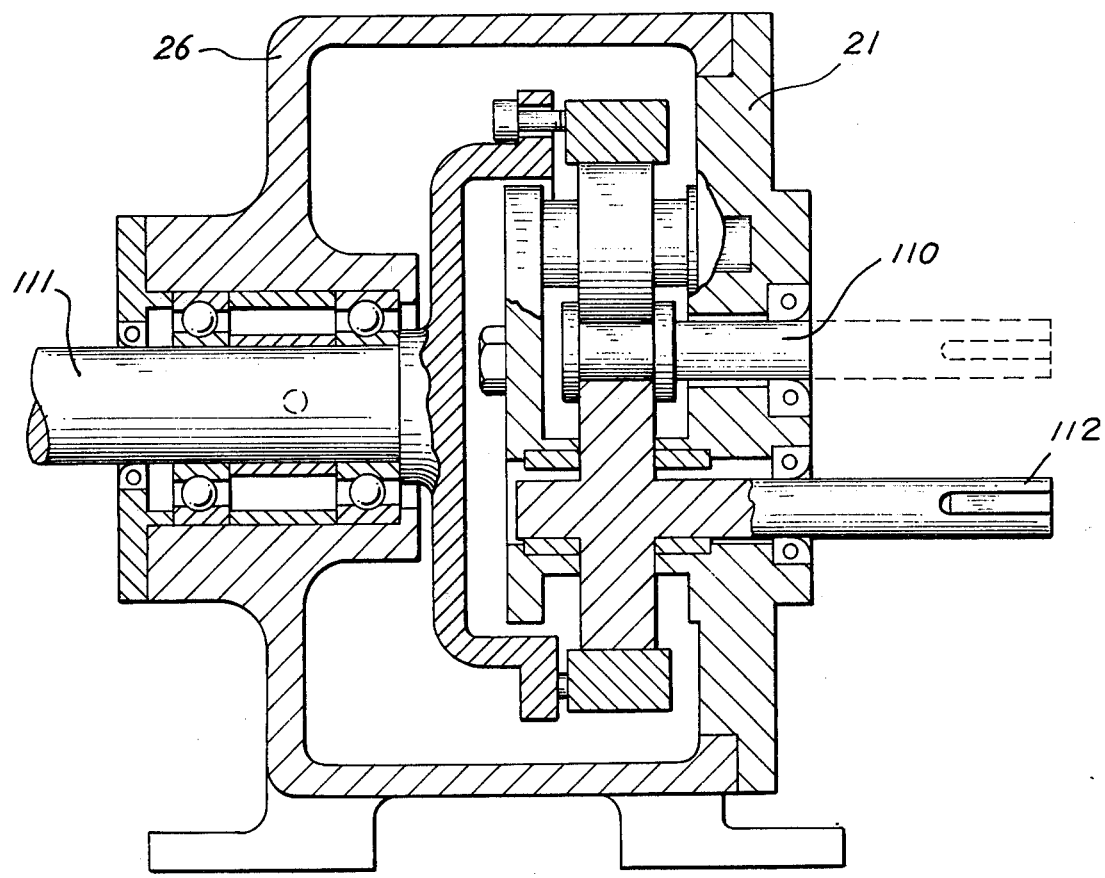
FIG. 12 is a longitudinal sectional view of a multiple input and/or output shaft embodiment of the present invention.

Still another variation in design of the present invention which permits multiple input or output shafts is shown in FIG. 12. Sometimes in the design of mechanical power transmission equipment, it is desirable to have a divided power path so that some portion of the main power is fed through power-take-off shafts to drive auxiliary equipment such as generators, fuel pumps, compressors, etc. On the other hand, it may be desirable to put power into the transmission through more than one shaft and take it out through more than one shaft. The present invention is adaptable to satisfy these requirements.

FIG. 12 shows a transmission design similar in general construction to that of FIGS. 2 and 3 except provision has been made to permit more than one auxiliary shaft to protrude from housing end cover 21. Sun shaft 110 and ring shaft 111 have been the principal shafts described in the invention to this point and either may be an input or an output shaft. In the variation presently being described, any or all of the five traction rollers in this invention may have a drive shaft extended external to the housing enclosure for the purpose of being an input or output power shaft singly or in combination. For example, in FIG. 12, ring shaft 11 1 could be the input shaft and shaft 112 could be a higher speed output shaft. If a second still higher speed output shaft was needed, then sun shaft 110 could be extended as shown in dotted outline. Flexible couplings or connections to all shafts can be used to preserve the necessary degrees of freedom designed into the various roller components.

It is to be understood that the invention above described may be modified in accordance with the follow-

What we claim is:

1. A rotary motion transmission device, operable in either direction of rotation with a fixed transmission ratio, comprising input and output shafts having spaced parallel axes of rotation, a ring roller having a cylindrical internal traction surface carried by one of said shafts, an inner roller having a cylindrical external traction surface carried by the other of said shafts, the traction surface of said inner roller extending into said ring roller such that an annular path of varying width is formed between the ring roller and said inner roller, three intermediate traction rollers positioned within said annular path in angularly spaced relation to each other, said five rollers having parallel axes of rotation, each intermediate roller contacting simultaneously said ring roller traction surface and said inner roller traction surface, one of said intermediate rollers being a wedging roller having 2° of freedom of movement in a plane perpendicular to the axis of the rollers, the two remaining intermediate rollers being reaction rollers each having at least 1° of freedom of movement in said plane, said ring roller having 2° of freedom of movement in said plane, the sum of the degrees of freedom of movement in said plane for all five said rollers being at least eight and not more than 10 when notional lines connect the centers of the said ring roller and said inner roller with the center of said wedging roller, said notional lines forming an angle which does not exceed twice the angle whose tangent is equal to the coefficient of traction.

2. The rotary motion transmission device of claim 1, wherein said three intermediate rollers have external traction surfaces of different diameters, the centers of said intermediate rollers being spaced from a plane extending through the input and output shaft axes.

3. The rotary motion transmission device of claim 1, wherein said three intermediate rollers have external traction surfaces of different external diameters, the center of the intermediate roller having the largest external diameter lying in a plane extending through the input and output shaft axes.

4. The rotary motion transmission device of claim 1, wherein two of said intermediate rollers have the same external diameter and are generally symetrically positioned about the plane extending through said input and output shaft axes, the third intermediate roller having a larger external diameter with its center positioned on the said plane, means for permitting one of said two intermediate rollers to function as said wedging roller and means for permitting the other of said two intermediate rollers to function as a said reaction roller.

5. The rotary motion transmission device of claim 4, and resilient means for urging at least one of said two intermediate rollers into engagement with both said ring roller and said inner roller.

6. The rotary motion transmission device of claim 5, wherein said resilient means is a spring.

7. The rotary motion transmission device of claim 1, including a housing, and means for constraining the said ring roller, inner roller and three intermediate rollers from excessive movement in the direction along the roller axes of rotation and departure in alignment and means for transmitting said constraining forces into said housing.

8. The rotary motion transmission device of claim 7, wherein at least one of said ring roller and said inner roller has opposing thrust shoulders which contact the side faces of the peripheral portions of the said three intermediate rollers.

9. The rotary motion transmission device of claim 1, wherein said ring roller and said inner roller each include spaced traction surface portions and said intermediate rollers are extended in the direction along their axes to cooperate in traction contact with said spaced traction surface portions.

10. The rotary motion transmission device of claim 1, including a housing, a shaft with an inner roller extending into said housing and each intermediate roller having opposite ends supported in said housing.

11. The rotary motion transmission device of claim 1, and bearing means for supporting one of said shafts which carries said ring roller and, means connecting said ring roller to said one shaft wherein said ring roller has two degrees of freedom of movement.

12. The rotary motion transmission device of claim 1, wherein said inner roller has 2° of freedom of movement, each ring roller and inner roller having a floating orientation relative to said shafts.

13. The rotary motion transmission device of claim 1, wherein one of said three intermediate rollers of largest diameter has 1° of freedom of movement, biasing means provided for each of the other two rollers for urging the first of said other two rollers into wedging contact between the said ring roller and said inner roller when transmitted torque sense is in one direction and when said torque sense is in opposite direction, the second of said other two rollers is urged into wedging contact between the said ring roller and said inner roller and where one of said other two rollers is a reaction roller with at least 1° of freedom of movement.

14. The rotary motion transmission device of claim 1, wherein one of said three intermediate rollers of largest diameter is a wedging roller and has 2° of freedom of movement, biasing means provided for said wedging roller for urging said wedging roller into wedging contact between said ring roller and said inner roller when transmitted torque sense is in either direction, other two of said three intermediate rollers are reaction rollers each with at least 1° of freedom of movement.

15. The rotary motion transmission device of claim 1, wherein one of said three intermediate rollers of largest diameter has spaced traction surfaces extending into peripheral recesses in other two of said three intermediate rollers and abuts said inner roller.

16. The rotary motion transmission device of claim 1, wherein said inner roller is supported on a shaft extending inward from a housing and said intermediate rollers are supported in cantilever fashion from said housing.

17. The rotary motion transmission device of claim 1, including a rotatable housing, a fixed housing cover, wherein said rotatable housing is supported at one location by a bearing mounted on a stationary shaft portion of said cover and supported at a second location by said ring roller.

18. The rotary motion transmission device of claim 1, including a housing, wherein at least one of said three intermediate rollers being provided with connecting means to a rotatable axel shaft that extends external to said housing and said axel shaft may be used as an input or output shaft.

\* \* \* \* \*